United States Patent [19]
Dierks et al.

[11] 3,736,015
[45] May 29, 1973

[54] WINDING MECHANISM FOR A CAMERA

[75] Inventors: James J. Dierks; Jeffrey R. Stoneham, both of Rochester, N.Y.

[73] Assignee: Eastman Kodak Company, Rochester, N.Y.

[22] Filed: Apr. 30, 1971

[21] Appl. No.: 139,123

[52] U.S. Cl.................242/71.2, 95/31 R, 242/71.4
[51] Int. Cl.............................................G03b 17/26
[58] Field of Search......................242/71.2, 71, 71.4, 242/71.1, 71.3, 67.1, 67.2, 67.3; 95/31 R

[56] References Cited
UNITED STATES PATENTS

| | | | |
|---|---|---|---|
| 2,975,990 | 3/1961 | Rodriguez | 242/71.2 |
| 3,459,110 | 8/1969 | Papke | 95/31 R |

Primary Examiner—George F. Mautz
Assistant Examiner—Edward J. McCarthy
Attorney—W. H. J. Kline and D. Peter Hochberg

[57] ABSTRACT

A mechanism for rotating a film cartridge wind-up core which has a gear attached thereto includes a manually rotatable ring gear having internal teeth engageable with the cartridge gear for effecting the rotation of the cartridge gear. The ring gear can be directly engaged with the cartridge gear, or coupled thereto via a gear train.

7 Claims, 4 Drawing Figures

Patented May 29, 1973
3,736,015
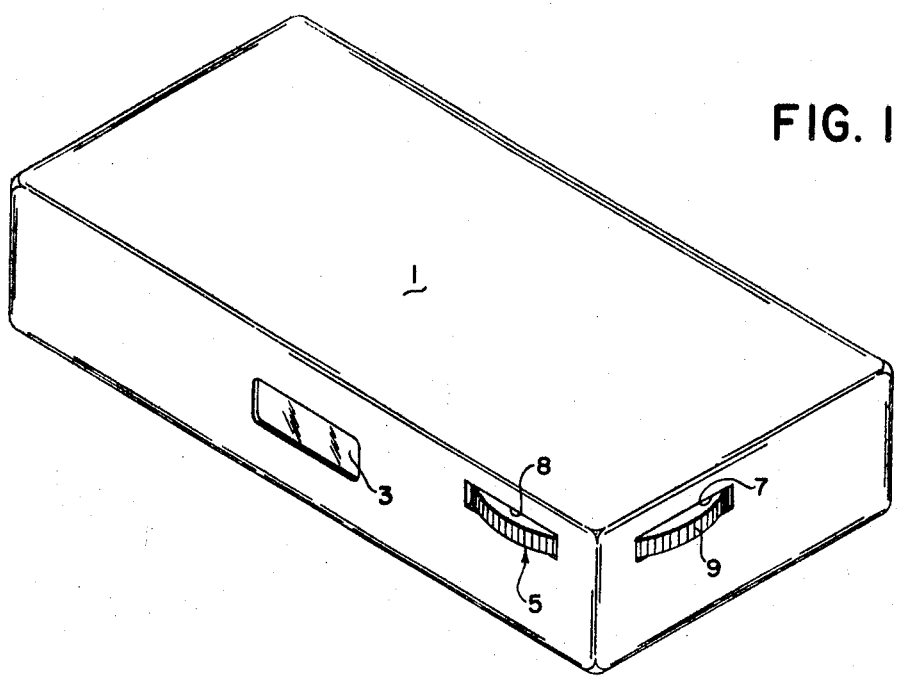
FIG. 1
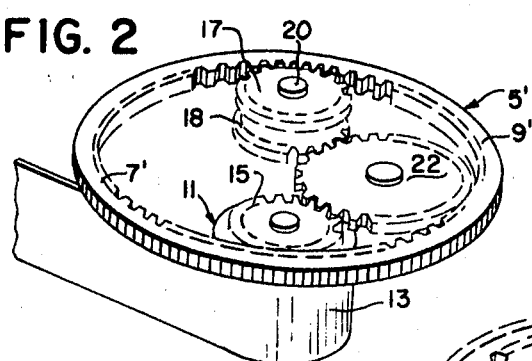
FIG. 2
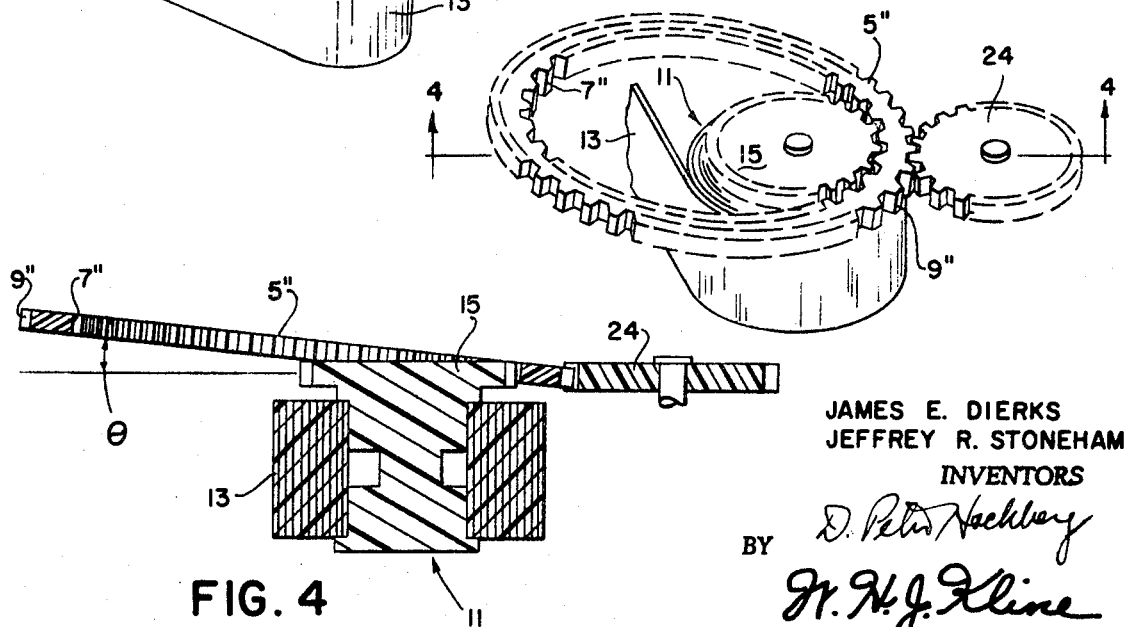
FIG. 3
FIG. 4
JAMES E. DIERKS
JEFFREY R. STONEHAM
INVENTORS
BY D. Peter Hochberg
 W. H. J. Kline
ATTORNEYS

WINDING MECHANISM FOR A CAMERA

BACKGROUND OF THE INVENTION

1. Field of the Invention

This invention relates to film advancing mechanisms for cameras, and in particular to mechanisms for actuating gear driven take-up cores of film cartridges loaded in cameras.

2. Description of the Prior Art

Most still cameras in current use are adapted to receive a roll of filmstrip and to incrementally advance the filmstrip past an exposure station at which frames of the filmstrip are successively exposed. The leading end of the filmstrip is generally fastened to a take-up core which is rotated to draw the film towards the core and to wind the film thereon. Some cameras effect film advancement by rotating a sprocket wheel which is engaged with perforations provided along the edges of the filmstrip. The various film advancing mechanisms, whether they be in cameras adapted to receive filmstrip in a single container as in most 35mm cameras, or in cameras adapted to receive a film cartridge comprising a pair of film compartments disposed on opposite sides of a film support wall, are actuated by a lever, knob or similar manually operatable device.

The actuating means for the film advancing mechanism must satisfy various criteria. It should be readily operatable, which requires that it be large enough to be manually displaced with ease. Levers and knobs can usually be gripped between the photographer's thumb and forefinger. On the other hand, the actuating means should not be susceptible to damage and it should not render the camera unwieldy. Most current camera bodies are of sufficient size relative to the film winding member that recesses can be provided in the camera body to accommodate the winding member whereby the member's dimensions and operating space do not detract from the basic size of the camera body.

There have recently been developed several subminiature cameras which find great utility by virtue of their ease of storage and their inconspicuous appearance. These cameras are designed to receive a film cartridge containing filmstrip having a size of about 16mm. A cartridge of this type can advantageously include a winding core disposed in a take-up chamber and having a gear attached thereto, the gear being rotatable by camera structure for transporting film in the cartridge. Such a cartridge is described in copending, commonly assigned U.S. patent application Ser. No. 26,014 filed in the name of Bresson et al. on Apr. 6, 1970 and entitled "Gear Drive for a Camera and Film Cartridge", now U.S. Pat. No. 3,650,489. The designer of a camera for receiving and operating the foregoing type of cartridge is posed with the difficult problem of maintaining a small size and low silhouette for the camera while providing a sturdy and effective device for actuating the film advancing mechanism in the camera. The problem is aggravated by the reduced size of the camera since the actuating device may have to withstand a greater operating force to compensate for the decreased space for force-saving leverage in the components of the film advancing mechanism. The knobs and levers which have previously been used for actuating the film advancing mechanism in the camera are inadequate for these small cameras because they add substantially to the dimensions of the camera if they are to be effective in use. On the other hand, if the size of these actuating members is reduced to a size commensurate with that of the camera, they become too weak to sustain the forces applied to them, and they are rendered too small to be easily operatable.

SUMMARY OF THE INVENTION

An object of the invention is to operate a film advancing mechanism in a subminiature camera.

Another object is to provide a rugged yet easily operatable means for rotating a gear driven film winding core in a camera.

A further object is to provide an effective, compact means for rotating a film cartridge take-up core having a winding gear thereon.

An additional object is to achieve the foregoing objects in a simple, economical manner without significantly detracting from the size or contour of the camera incorporating the invention.

Other objects will be apparent to those skilled in the art from the description to follow and from the appended claims.

The foregoing objects are achieved according to a preferred embodiment of the invention by the provision of a camera film transport mechanism comprising an internal ring gear which is coupled to a gear on the take-up core of a film cartridge loaded in the camera. A portion of the outer periphery of the ring gear is accessible for manual actuation by the photographer. The ring gear can be inclined to facilitate insertion and removal of the cartridge from the camera, and the ring gear can be operatively coupled to an exposure counting mechanism.

BRIEF DESCRIPTION OF THE DRAWINGS

Reference is made to the accompanying drawings in which:

FIG. 1 is a rear isometric view of a camera according to the invention;

FIGS. 2 and 3 are isometric views of film advancing mechanisms pursuant to two embodiments of the invention; and FIG. 4 is a section taken through the line 4—4 in FIG. 3.

DETAILED DESCRIPTION OF PREFERRED EMBODIMENTS OF THE INVENTION

The present invention provides a simple and effective film advancing mechanism for a camera which finds particular applicability in very small still cameras — e.g. those of the subminiature type which are designed to take a film size of about 16mm or less. The invention can be used equally well on all sizes of cameras, but the advantages are most apparent on the smaller cameras. Unlike conventional mechanisms which employ levers which extend relatively far from a camera housing during their operation or which employ knobs mounted on the camera, the present mechanism adds only nominally to the external size of the camera, even during its operation. The invention is intended to operate a gear driven film transport device such as by effecting the rotation of a gear mounted on the winding core in the take-up chamber of a film cartridge. Accordingly, the invention provides an internal ring gear which is manually rotatable for rotating a driven gear disposed at the interior of the ring gear. The size of the ring gear thus can define the volume of the entire mechanism. The ring gear can have a very small height dimension, and can unobstructively surround unrelated camera parts, rendering it easily adaptable for use in the camera. A considerable mechanical advantage can be achieved for even a tiny film core gear by virtue of a relatively large diameter of the ring gear. The camera housing can be rendered virtually unchanged by the provision of the ring gear, since only a part of the periphery of the gear need protrude through the housing to be manually accessible.

Referring to FIG. 1, a subminiature camera 1 of the type adapted to receive a gear driven film cartridge is shown. The cartridge can be of the type disclosed in commonly assigned copending U.S. patent application Ser. No. 25,957, filed Apr. 6, 1970 in the name of Evan A. Edwards and entitled "Gear Drive for a Camera and Film Cartridge", now abandoned; and previously cited Ser. No. 26,014, filed Apr. 6, 1970. The camera includes a housing 1 which has the configuration of a right parallelapiped. At the rear part of housing 1 a window 3 is provided through which indicia on the cartridge or film product loaded in the camera are visible. Portions of a ring gear 5 extend through openings 7 and 8 located at the side and rear of the camera, respectively. As explained below, the film transport function is accomplished by rotating ring gear 5. The latter member is knurled or serrated on its outer periphery 9 to facilitate the manual engagement thereof. Since ring gear 5 can be rotated by simply moving one's finger along the side or back of the camera against the periphery of the ring gear, this member need only extend out of the housing a very small distance. Although two openings 7 and 8 are shown, either of these openings could be dispensed with, or other openings at the other side or front of the camera could be added, depending on the size and location of the ring gear.

FIG. 2 shows one form which the film advancing mechanism of camera 1 can take. Parts of the camera and cartridge not directly related to the film advancing function have been omitted for the sake of clarity. The only parts of the cartridge shown are a winding core 11 and the film 13, the latter including photosensitive filmstrip on which protective backing paper may be superposed. Film core 11 includes at its upper end a gear 15 which can be integral with the rest of the core. Rotation of gear 15 effects rotation of core 11, thereby winding film 13 thereon. It can be seen that the invention does not require core 11 to be in a film cartridge, and the invention can be used equally well with any gear driven film winding core such as a winding spool in a non-cartridge camera.

Film core 11 is rotated in response to the rotation of the ring gear, which in the embodiment of FIG. 2 is designated 5'. The ring gear is rotated by the manual engagement of its periphery 9' which is rendered accessible in the manner described earlier. In order to facilitate the loading and removal of the cartridge from the camera, ring gear 5' is disposed above the cartridge. Ring gear 5' is coupled to gear 15 via the gear train comprising gears 17 and 18 which are pinned together by an axle 20. A gear 22 is enmeshed with gears 18 and 15 for transmitting rotation of the gear 18 to the gear 15 and to core 11. Film is advanced by merely rotating ring gear 5' in a counterclockwise direction. The internal teeth of ring gear 5', due to their engagement with the teeth of gear 17, cause the rotation of gears 17 and 18, which in turn rotate gears 22 and 15. The structure of the mechanism is extremely simple, there not even being a clutch required.

Another embodiment of the invention is shown in FIGS. 3 and 4. The ring gear and its constituent elements correspond to like parts described above, and have been ascribed double prime designations. The gear train of this embodiment is simplified by the elimination of the gears intermediate to ring gear 5" and gear 15. In order to permit the insertion of a cartridge in the camera without obstruction from ring gear 5", the latter is inclined at an angle $\theta$ towards the entrance to the film compartment of the camera. In addition to its internal teeth, ring gear 5" is provided with external gear teeth 9" for engaging the teeth of a gear 24, the latter being the input to a film frame counting device. Rotation of ring gear 5" thus simultaneously effects the rotation of gears 15 and 24. The size of the film advancing mechanism is not increased by coupling it to the film counting device and such coupling can therefore be done while minimally increasing the size of the camera. As in the previous embodiment, this embodiment of the invention is characterized by its simplicity of construction and operation.

The invention has been described in detail with particular reference to preferred embodiments thereof but it will be understood that variations and modifications can be effected within the spirit and scope of the invention.

We claim:

1. In a camera adapted to receive strip film and a film winding gear and to advance such received film by means of a winding operation; the improvement comprising: a ring gear having internal teeth and an external periphery; means mounting said ring gear
   in said camera at a location such that said internal teeth are cooperable with said film winding gear received in said camera;
   for rotating said winding gear; and
   means mounting said ring gear in said camera at a location such that said external periphery is manually engageable for rotating said ring gear.

2. A camera according to claim 1 wherein the external periphery of said ring gear is serrated.

3. A camera according to claim 1 further comprising a housing, means in said housing for holding said ring gear and an opening in said housing through which the periphery of said ring gear protrudes for facilitating the manual engagement thereof.

4. A camera adapted to receive a film cartridge of the type having a rotatable film winding core and a winding gear drivingly coupled to the core; said camera comprising:
   means for receiving a cartridge so that the winding gear is rotatable in a first plane when the cartridge is received in said camera; and
   a ring gear having internal teeth engageable with the winding gear of a received cartridge, said ring gear being rotatable in a plane inclined relative to said first plane for facilitating insertion and removal of a cartridge in a direction parallel to said first plane.

5. A camera according to claim 4 wherein said ring gear has an external periphery which is manually engageable for rotating said ring gear.

6. A camera adapted to receive a film cartridge having a wind-up core and a gear attached to the core for rotating the core, said camera comprising:
   means for receiving such a cartridge; and a ring gear having internal teeth for drivingly engaging the gear of a received cartridge, said ring gear being rotatable for rotating the gear of a received cartridge to rotate the core.

7. In a camera adapted to receive strip film and to advance such received film by means of a winding operation; the improvement comprising:
a ring gear having internal teeth, said ring gear being mounted in said camera at a location such that said internal teeth are cooperable with a film winding gear;
a film frame counting mechanism; and
a third gear for actuating said film frame counting mechanism, said third gear being coupled to said ring gear and rotatable in response to rotation of said ring gear for actuating said counting mechanism.

* * * * *